UNITED STATES PATENT OFFICE.

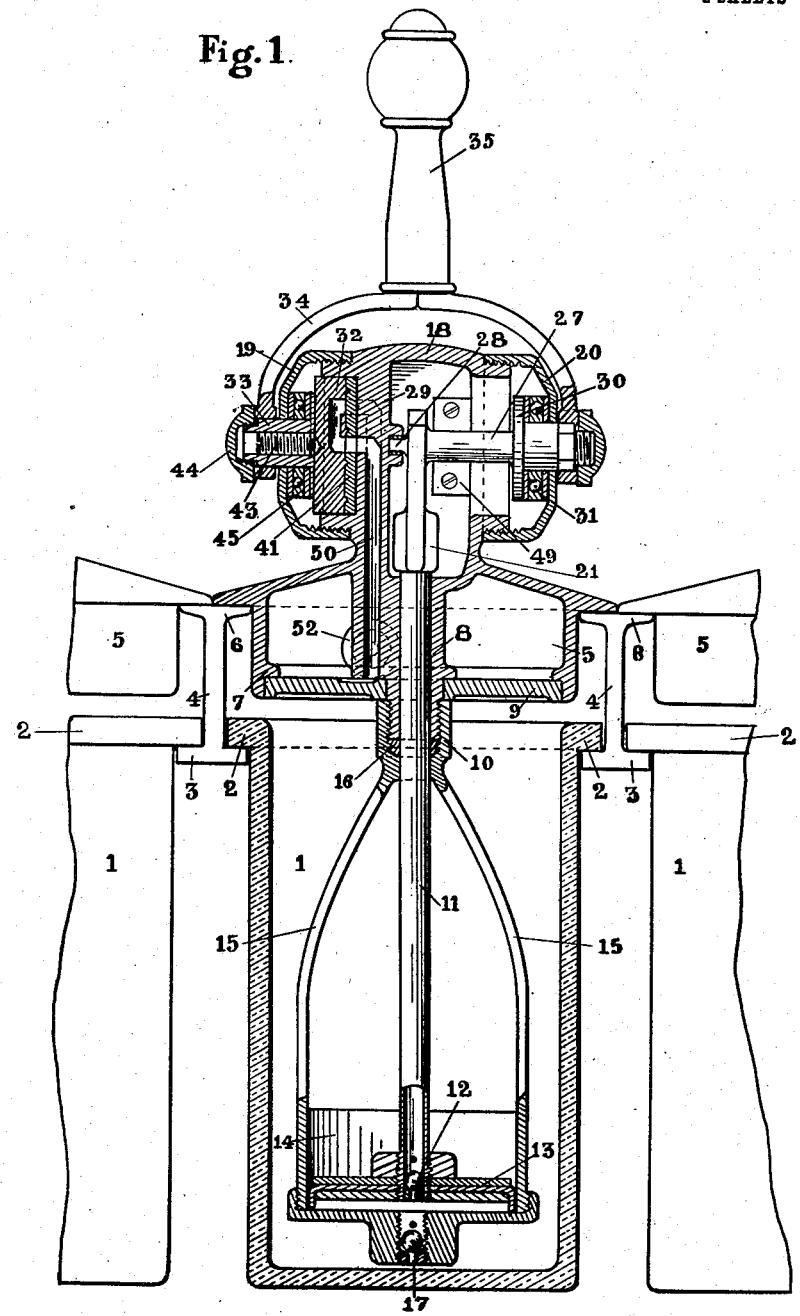

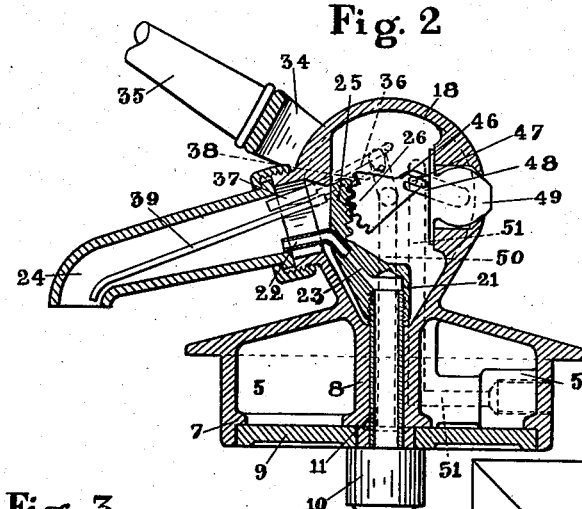
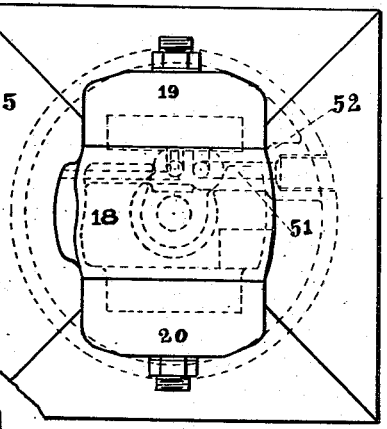
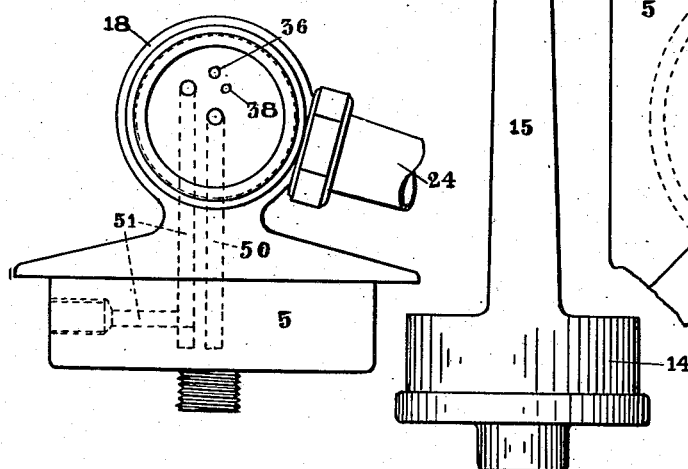
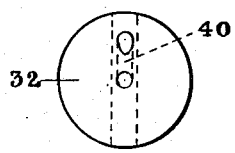
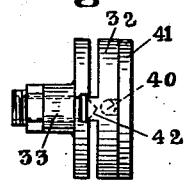

ROBERT GEORGE MARSH, OF DETROIT, MICHIGAN.

DISPENSING APPARATUS.

942,273.  Specification of Letters Patent.  Patented Dec. 7, 1909.

Application filed April 19, 1909. Serial No. 490,739.

*To all whom it may concern:*

Be it known that I, ROBERT GEORGE MARSH, a citizen of the United States of America, residing at Detroit, in the county of Wayne and State of Michigan, have invented certain new and useful Improvements in Dispensing Apparatus, of which the following is a specification, reference being had therein to the accompanying drawings.

This invention relates to dispensing apparatus, suitable for soda water fountains or the like, and more especially to an arrangement thereof whereby a movement in one direction of a single member causes a discharge of a measured quantity of syrup or other uncharged liquid together with a definite quantity of charged, carbonated or aerated water or the like under pressure, the flow of the latter being restricted or otherwise changed at the end to agitate the discharged liquid into foam, as in the customary way. The device is also self-registering or adapted to record the number of drinks sold.

The invention consists in the matters hereinafter set forth, and more particularly pointed out in the appended claims.

In the drawings, Figure 1 is a view in vertical section of one unit of a portion of a dispensing apparatus embodying features of the invention, together with parts of adjacent units, showing a general arrangement or assembly. Fig. 2 is a view in vertical section at right angles to Fig. 1, of a measuring chamber, barrel and operating parts. Fig. 3 is a view of a chamber, bonnet and adjacent parts. Fig. 4 is a plan view of a chamber and bonnet. Figs. 5 and 6 are views in detail of a controlling valve closure.

A series of syrup tanks or receptacles 1 are secured beneath the top of a table or counter, preferably by ledges 2 on their open, upper ends sliding on the lower flanges 3 of parallel I-beams 4. A hollow cover or measuring chamber 5 rests either on the top of each tank directly, or, as herein indicated, is supported on the upper flanges 6 of the I-beams whereby they may be drawn out if desired, or they may be arranged in other suitable manner.

The cover, in its preferred form, has a depending annular flange 7 and a central boss 8, on which a bottom plate 9 is secured, as by a ferrule 10 screw-threaded on the depending end of the boss. The latter is axially apertured and a tubular piston rod 11 is longitudinally reciprocable therein. An upwardly opening check valve 12 is placed in the lower end of the piston rod, and a piston head or plunger 13 of any preferred construction is secured thereon, and has a sliding fit in a short barrel 14 which forms a measuring vessel for the syrup or non-carbonated liquid. The barrel is suitably supported from the cover near the bottom of the tank 1, as by stirrup arms 15 whose upper convergent ends are secured to or formed integrally on the ferrule 10, which may likewise constitute a stuffing box to retain packing 16 around the piston rod. An inwardly opening check valve 17 of any preferred form is secured in an inlet in the lower part of the barrel 14 or the piston itself may uncover properly disposed inlet ports or other suitable inlet valve construction used in standard pump design, may be employed.

The upper portion of the piston rod 11 extends through the cover 5 into a hollow valve casing or bonnet 18, preferably integral with the cover, in the form of a horizontal cylinder with end pieces 19 and 20, screw-threaded or otherwise detachably secured thereon.

A cap 21 on the upper end of the piston rod 11 has a lateral nipple 22 that is connected with the bore of the rod by a duct 23 and extends into the upper end of a mouth piece or nozzle 24 on the side of the bonnet 18. Rack teeth 25 on an extension of the cap are engaged by a segmental gear 26 on a spindle 27, one end 28 of which engages a bearing in a wall 29 of the bonnet while the other extends through the end piece 20, a collar 30 and interposed friction bearing 31 of any preferred type forming an end thrust bearing.

A valve closure 32 is seated in a counterbored recess in the outer face of the wall 29 in axial alinement with the spindle 27, with an axial stem 33 extending through and journaled in the end piece 19. The closure is turned in unison with the spindle 27 by a yoke 34 of appropriate design spanning the bonnet 18 and terminating in an operating handle 35. The closure 32 is ported to connect an axial opening in the recess or seat, which is the mouth of a passage 50 in the cross-wall 29 whose lower end opens into the interior of the cover 5 near the bottom plate 9, with a duct 51 extending through the wall 29 and a boss 52 to the exterior face of the flange, when the handle 35 is at the rearward part of its throw, with the piston 13 raised to the upper end of the barrel 14. The boss 52 is interiorly screw-threaded or otherwise fitted for pipe connection with a charging tank.

When the handle is approaching its forward limit of motion, the closure 32 is adapted to connect the passage 50 with a discharge opening 36 through the wall 29 which leads to a short pipe 37 delivering into the upper end of the nozzle 24. As the handle reaches its forward limit, the disk 32 connects the passage 50 with a smaller restricted duct 38 from the outer end of which a tube 39, smaller than the pipe 37, leads to the mouth of the nozzle 24.

As a preferred form of construction, the closure 32 is a disk with a transverse channel 40, and a packing 41 of suitable material on its face. A transverse rib 42 on the outer face of the disk engages a diametrical slot in the adjacent enlarged end or collar of its stem 33 so as to turn therewith. A take-up screw 43 in an axial aperture of the stem bears against the rib, and is set up as the valve wears, to prevent the leakage. A cap 44 on the outer end of the stem, which is keyed or otherwise non-rotatably locked with the yoke 34, covers the stem end. A friction bearing 45 of any approved form between the stem collar and bonnet end piece 19 is provided to resist end thrust. The segmental gear 26 has an arm 46 with stud 47 engaging a lever, arm or other member 48 or is otherwise operatively connected to a registering device 49 of any conventional type which is mounted in the barrel 18 with its face, dial, or register plate visible through a view-hole in the bonnet, so that a stroke of the operating handle is registered on the dial.

In operation, the handle, when moved to its normal, rearward position, draws the piston to the top of the measuring barrel, filling it from the contents of the receptacle or jar. At the same time, it turns the valve closure so that the top or measuring chamber is connected with the charging tank and is at once filled therefrom. When the operator wishes to draw a glass, he rocks the handle forward, thereby depressing the piston and forcing a definite amount of syrup up through the piston rod and its cap into the nozzle which empties into the glass. As the handle moves forward, it opens the charged top or measuring chamber into the nozzle through the large short pipe, thus drawing a comparatively quiet stream of the carbonated water into the glass. It then shifts this discharge into the small pipe which ejects a small stream with sufficient force into the glass to produce the usual foaming effect desired. A reversal of the handle restores the parts to the initial position. Each forward movement of the lever is likewise recorded on the registering mechanism.

Obviously, changes in the details of construction may be made without departing from the spirit of the invention and I do not care to limit myself to any particular form or arrangement of parts.

What I claim as my invention is:—

1. In a liquid dispensing apparatus, a series of receptacles for liquids, a measuring chamber for each receptacle having an inlet adapted to be connected to a charging tank and an outlet, a nozzle for the outlet, a single controlling member adapted to alternately open the inlet and outlet, and means for forcing a definite quantity of liquid from the receptacle out through the chamber nozzle, and means adapted to operate the controlling member in proper relation to the discharge from the receptacle, each measuring chamber, controlling member, and measuring means together constituting a unit structure separable from and adapted to form a cover for the companion receptacle.

2. In a liquid dispensing apparatus, a series of receptacles for liquids, a measuring chamber for each receptacle forming a removable cover therefor, and having an inlet adapted to be connected to a charging tank and an outlet, a nozzle for the outlet, a measuring barrel attached to the cover adapted to be immersed in the contents of the receptacle when the cover is in place, and means for forcing the barrel contents out through the chamber nozzle in proper relation to the discharge from the chamber, and means adapted to operate a controlling member, each chamber with its barrel, controlling member and operating means forming a unit structure bodily removable from the companion receptacle.

3. In a liquid dispensing apparatus, a series of receptacles for liquids, a measuring chamber for each receptacle having an inlet adapted to be connected to a charging tank and an outlet, a nozzle for the outlet a controlling member adapted to alternately open the inlet and outlet, means for forcing a definite quantity of liquid from the receptacle out through the chamber nozzle, and means adapted to operate the controlling member in proper relation to the discharge from the receptacle, and recording means in the chamber operatively connected to the receptacle discharging means adapted to register each discharge.

4. In a liquid dispensing apparatus, a series of receptacles for liquids, a measuring chamber for each receptacle having an inlet adapted to be connected to a charging tank and an outlet, a controlling member adapted to alternately open the inlet and outlet, a nozzle for the outlet means for forcing a definite quantity of liquid from the receptacle out through the chamber nozzle, and means adapted to operate the controlling member in proper relation to the discharge from the receptacle, and recording means in the chamber operatively connected to the receptacle discharging means adapted to register each discharge, each chamber with the controlling member, measuring means and registering mechanism constituting a unit structure separate from and forming a cover on the companion receptacle.

5. In a liquid dispensing apparatus, parallel I-beams in spaced relation, open liquid receptacles supported by lateral ledges on the lower flanges of adjacent beams, a measuring chamber for each receptacle adapted to be supported thereover on the upper flanges of the beams and provided with an inlet adapted to be connected to a charging tank and an outlet, a nozzle for the outlet a measuring barrel secured to each chamber and immersed in the contents of the receptacle when the chamber is in operative position, a single controlling member on the chamber adapted to alternately open the chamber inlet and outlet, and means mounted on the chamber for forcing the contents of the barrel out through the chamber nozzle, and means adapted to operate the controlling member in proper relation to the discharge from the barrel, the chamber, controlling member, barrel and forcing means forming a removable unit structure.

6. In a liquid dispensing apparatus, a liquid receptacle, a measuring chamber forming a removable cover therefor and having an inlet adapted to be connected to a charging tank and an outlet, a nozzle for the outlet, a single member on the chamber adapted to alternately open the inlet and outlet, a measuring barrel secured to the chamber and adapted to be immersed in the contents of the receptacle when the cover is in place, means for forcing the contents of the barrel out through the chamber nozzle, and means on the chamber adapted to simultaneously operate the barrel emptying means and controlling member in proper relation.

7. In a liquid dispensing apparatus, a liquid receptacle, a measuring chamber forming a removable cover therefor and having an inlet adapted to be connected to a charging tank and an outlet, a nozzle for the outlet, a single member on the chamber adapted to alternately open the inlet and outlet, a measuring barrel secured to the chamber and adapted to be immersed in the contents of the receptacle when the cover is in place, means for forcing the contents of the barrel out through the chamber nozzle, means on the chamber adapted to simultaneously operate the barrel emptying means and controlling member in proper relation, and recording means on the chamber adapted to register each discharge from the barrel and worked by the operating means.

8. In a liquid dispensing apparatus, a liquid receptacle, a measuring chamber having an inlet adapted to be connected to a charging tank, a discharge nozzle with an open and a restricted outlet from the chamber, a controlling member in the chamber adapted to successively close the inlet, open outlet and restricted outlet, a barrel secured to the chamber and immersed in the contents of the receptacle, means for forcing the contents of the barrel out through the nozzle, and means for operating the forcing means and controlling member in proper relation.

9. In a liquid dispensing apparatus, a liquid receptacle, a measuring chamber having an inlet adapted to be connected to a charging tank, a discharge nozzle with an open and a restricted outlet from the chamber, a controlling member in the chamber adapted to successively close the inlet, open outlet and restricted outlet, a barrel secured to the chamber and immersed in the contents of the receptacle, means for forcing the contents of the barrel out through the nozzle, means for operating the forcing means and controlling member in proper relation, and recording means on the chamber adapted to register each discharge from the barrel and worked by the operating means.

10. In a liquid dispensing apparatus, a liquid receptacle, a measuring chamber forming a removable cover therefor and having an inlet adapted to be connected to a charging tank and an outlet, a nozzle for the outlet, a single member on the chamber adapted to alternately open the inlet and outlet, a measuring barrel secured to the chamber and adapted to be immersed in the contents of the receptacle when the cover is in place, means for forcing the contents of the barrel out through the chamber outlet, and a rocking handle on the chamber adapted as it is swung forward to operate the forcing means to discharge the barrel, and the controlling member to close the inlet, to open and close the open outlet and then open the restricted outlet.

11. In a liquid dispensing apparatus, a liquid receptacle, a measuring chamber having an inlet adapted to be connected with a charging tank and a discharge nozzle in communication with the chamber through both an open and a restricted outlet, a controlling member adapted to successively close the inlet, to open and close the open outlet, and to open the restricted outlet, a barrel suspended near the bottom of the receptacle from the chamber, a piston head reciprocable therein, a hollow, valved piston rod from the piston whose upper end extends through the chamber bottom and discharges into the nozzle, and an operating handle adapted to reciprocate the piston rod and operate the controlling member in proper timed relation.

12. In a liquid dispensing apparatus, a liquid receptacle, a measuring chamber having an inlet adapted to be connected with a charging tank and a discharge nozzle in communication with the chamber through both an open and a restricted outlet, a controlling member adapted to successively close the inlet, to open and close the open outlet, and to open the restricted outlet, a barrel suspended near the bottom of the receptacle from the chamber, a piston head reciprocable therein, a hollow, valved piston rod from the piston whose upper end extends through the chamber bottom and discharges into the nozzle, a rack on the piston rod, a segmental gear engaging the rack, and an operating handle adapted to operate the gear and controlling member in proper timed relation.

13. In a liquid dispensing apparatus, a liquid receptacle, a measuring chamber having an inlet adapted to be connected to a charging chamber, an open outlet, and a restricted outlet, a nozzle on the chamber into which the outlets discharge, a single valve closure adapted to successively close the inlet, the open outlet and restricted outlet, a barrel suspended in the receptacle from the cover, a piston reciprocable therein, a hollow valved piston rod from the piston whose upper end extends through the chamber bottom and is adapted to discharge into the nozzle, a rack on the upper end of the rod, a segmental gear engaging the rack, and a handle on the chamber operating the gear and closure adapted when swung in one direction to operate the closure to close the inlet, open and close the open outlet, and open the restricted outlet, and simultaneously therewith to depress the piston.

14. In a liquid dispensing apparatus, a liquid receptacle, a measuring chamber having an inlet adapted to be connected to a charging chamber, an open outlet, and a restricted outlet, a nozzle on the chamber into which the outlets discharge, a single valve closure adapted to successively close the inlet, open and close the open outlet and open the restricted outlet, a barrel suspended in the receptacle from the cover, a piston reciprocable therein, a hollow valved piston rod from the piston whose upper end extends through the chamber bottom and is adapted to discharge into the nozzle, a rack on the upper end of the rod, a segmental gear engaging the rack, a handle on the chamber operating the gear and closure adapted when swung in one direction to operate the closure to close the inlet, open and close the open outlet and open the restricted outlet, and simultaneously therewith to depress the piston, and a recording mechanism in the chamber operated by the gear and adapted to register each stroke of the piston.

15. In a liquid dispensing apparatus, a liquid receptacle, a measuring chamber having an inlet adapted to be connected to a charging chamber, an open outlet, and a restricted outlet, a nozzle on the chamber into which the outlets discharge, a single valve closure adapted to successively close the inlet, open and close the open outlet and open the restricted outlet, a barrel suspended in the receptacle from the cover, a piston reciprocable therein, a hollow valved piston rod from the piston whose upper end extends through the chamber bottom and is adapted to discharge into the nozzle, a rack on the upper end of the rod, a segmental gear engaging the rack, a handle on the chamber operating the gear and closure adapted when swung in one direction to operate the closure to close the inlet, open and close the open outlet, and open the restricted outlet, and simultaneously therewith to depress the piston, a recording mechanism on the chamber operated by the gear and adapted to register each stroke of the piston, and a bonnet on the chamber forming a housing and support for the gear, handle and recording mechanism.

16. In a liquid dispensing apparatus, a liquid receptacle, a measuring chamber over the receptacle having an inlet adapted to be connected to a charging tank, an open outlet and a restricted outlet, a bonnet on the chamber, a single valve closure in the bonnet controlling the inlet and outlet, a central boss in the chamber, a ferrule secured to the boss below the chamber bottom, stirrup arms from the ferrule, a barrel on the lower ends of the arms alined with the boss, a piston reciprocable in the barrel, a hollow piston rod for the piston having an intake check valve in its lower end and extending through a guide aperture in the boss into the bonnet, a nozzle on the bonnet into which the chamber outlets and piston rod discharge, a rack on the upper end of the rod, a gear in the bonnet meshing with the rack, and a handle on the bonnet operating the gear and closure.

17. In a liquid dispensing apparatus, a liquid receptacle, a measuring chamber over the receptacle having an inlet adapted to be connected to a charging tank, an open outlet and a restricted outlet, a bonnet on the chamber, a single valve closure in the bonnet controlling the inlet and outlet, a central boss in the chamber, a ferrule secured to the boss below the chamber bottom, stirrup arms from the ferrule, a barrel on the lower ends of the arms alined with the boss, a piston reciprocable in the barrel, a hollow piston rod for the piston having an intake check valve in its lower end and extending through a guide aperture in the boss into the bonnet, a nozzle on the bonnet into which the chamber outlets and piston rod discharge, a rack on the upper end of the rod, a gear in the bonnet meshing with the rack, a handle on the bonnet operating the gear and closure, and a recording mechanism in the bonnet operatively connected to the piston rod and adapted to register each downstroke thereof.

18. In a liquid dispensing apparatus, a liquid receptacle, a measuring chamber over the receptacle having an inlet adapted to be connected to a charging tank, an open outlet and a restricted outlet, a bonnet on the chamber, a single valve closure in the bonnet controlling the inlet and outlet, a central boss in the chamber, a ferrule secured to the boss below the chamber bottom, stirrup arms from the ferrule, a barrel on the lower ends of the arms alined with the boss, a piston reciprocable in the barrel, a hollow piston rod for the piston having an intake check valve in its lower end and extending through a guide aperture in the boss into the bonnet into which the chamber outlets and piston rod discharge, a rack on the upper end of the rod, a gear in the bonnet meshing with the rack, and a handle swinging on the bonnet, operatively connected to the gear and closure and adapted when moved in one direction to depress the piston and to operate the closure to close the inlet, open and close the open outlet, and to open the restricted outlet in succession.

19. In a liquid dispensing apparatus, a liquid receptacle, a measuring chamber over the receptacle having an inlet adapted to be connected to a charging tank, an open outlet and a restricted outlet, a bonnet on the chamber, a single valve closure within the bonnet controlling the inlet and outlets, a central boss in the chamber, a ferrule secured to the boss below the chamber bottom, stirrup arms from the ferrule, a barrel on the lower ends of the arms alined with the boss, a piston reciprocable in the barrel, a hollow piston rod for the piston having an intake check valve in its lower end and extending through a guide aperture in the bonnet, a nozzle on the bonnet into which the chamber outlets and piston rod discharge, a rack on the upper end of the rod, a gear in the bonnet meshing with the rack, a handle on the bonnet operating the gear and closure, and a recording mechanism housed in the bonnet with a registering face visible through a view hole in the bonnet and provided with an operating member engaged by the piston operating mechanism.

In testimony whereof I affix my signature in presence of two witnesses.

ROBERT GEORGE MARSH.

Witnesses:
C. R. STICKNEY,
A. M. DORR.